United States Patent [19]

Kawata

[11] Patent Number: 4,991,463
[45] Date of Patent: Feb. 12, 1991

[54] DEVICE FOR INDEXING

[75] Inventor: Yasuyuki Kawata, Kyoto, Japan

[73] Assignee: Kawata Chuck Manufacturing Co., Ltd., Kyoto, Japan

[21] Appl. No.: 385,280

[22] Filed: Jul. 25, 1989

Related U.S. Application Data

[62] Division of Ser. No. 57,340, Jun. 2, 1987, Pat. No. 4,884,474.

[30] Foreign Application Priority Data

Aug. 2, 1986 [JP] Japan .................................. 61-182338

[51] Int. Cl.$^5$ ............................................. B23B 29/24
[52] U.S. Cl. ........................................................ 74/817
[58] Field of Search ................. 74/817, 813 R, 813 L, 74/814, 815, 816, 822, 823, 824, 826

[56] References Cited

U.S. PATENT DOCUMENTS

| | | | |
|---|---|---|---|
| 2,225,426 | 12/1940 | Aronson | 74/813 L X |
| 2,262,103 | 11/1941 | Laessker | 74/813 L X |
| 2,618,982 | 11/1952 | Mead | 74/813 L |
| 2,995,958 | 8/1961 | Jungeling et al. | 74/813 |
| 3,120,134 | 2/1964 | Sweeney | 74/823 |
| 3,186,260 | 6/1965 | Dugas | 74/813 L X |
| 3,739,660 | 6/1973 | Schubert | 74/815 |
| 4,028,966 | 6/1977 | Taylor | 74/813 L X |
| 4,037,433 | 7/1977 | Freer | 74/820 |
| 4,524,655 | 6/1985 | Waldron et al. | 74/813 L X |
| 4,606,244 | 8/1986 | Schneemann | 74/816 |

FOREIGN PATENT DOCUMENTS

| | | |
|---|---|---|
| 245177 | 11/1987 | European Pat. Off. . |
| 109413 | 2/1899 | Fed. Rep. of Germany . |
| 1502945 | 9/1963 | Fed. Rep. of Germany . |
| 1527153 | 7/1969 | Fed. Rep. of Germany . |
| 128541 | 8/1969 | Fed. Rep. of Germany . |
| 2929728 | 2/1980 | Fed. Rep. of Germany . |
| 1575569 | 6/1969 | France . |
| 2308450 | 4/1976 | France . |
| 55-112753 | 8/1980 | Japan . |
| 607707 | 5/1978 | U.S.S.R. . |

OTHER PUBLICATIONS

Catalogue No. 1 of Sakamaki Manufacturing Company Ltd.
Catalogue No. 2 of Sakamaki Manufacturing Company Ltd.
Catalogue No. 3 of Sakamaki Manufacturing Company Ltd.
Yukiwa Products, Sakamaki Mfg. Co., Ltd.-Catalog No. 1202E.
Yukiwa Super Divider DEF Series DEF(S), 320-400.

Primary Examiner—Vinh T. Luong
Attorney, Agent, or Firm—Morgan & Finnegan

[57] ABSTRACT

In a device for indexing a work attached to a cutting device of a machine center, the device for indexing comprises an indexing plate connected to a driving shaft of an indexing table and held by a stopper on the normal position on a base, a push bar interlocking operatively with an extra action other than the normal action of a tool to move linearly relative to the base, an actuating member for rotating the indexing plate by engaging the push bar operatively. The device is so constructed to disengage a stoppage of the indexing plate by the stopper and rotate the indexing at fixed angles with the aid of the actuating member when indexing a work.

6 Claims, 4 Drawing Sheets

DEVICE FOR INDEXING

BACKGROUND OF THE INVENTION

1. Field of the Invention

The present invention generally relates to improvement in a device designed for indexing a work attached to a cutting device of a machining center at fixed angles.

THE DESCRIPTION OF PRIOR ART

This kind of device for indexing, wherein a mechanical coupling or an electrical counting device is utilized to index work at fixed angles, has conventionally been known.

For example, the former is a device adapted for detecting an engagement between a plurality of index holes formed in concyclic positions in an index table and an index plunger, thereby transmitting revolutions of a driving motor through some timing gears into a driving shaft and indexing a work to rotate at fixed angles.

The latter is a device adapted for applying pulse signals to an indexing table by providing a pulse generator and counting the pulse signals by provisions of a counting device, thereby rotating the indexing table from a reference position at fixed angles by a driving motor and indexing a work.

On the other hand, a device for manually indexing the work so as to be adapted for unclamping, indexing and clamping the work, has been known.

The above device for indexing mechanically or electrically must be provided with an indexing table, various devices for actuating the indexing table and the like, for example driving shafts and timing gears. The device has, therefore, some defects which lead to its increased cost due to its large size.

Though a tool of the cutting device is controlled in accordance with the prescribed programming of an NC device, i.e. Numerical Control Device, the above-described device for indexing must be designed for actuating the indexing table, independent of machining, resulting in this machining and indexing being extremely troublesome.

Furthermore, as the prior art indexing table is actuated to rotate electrically, utilizing the other hydraulic or air-pressure source, electrical wirings and hydraulic or air-pressure lines are required. Thus it prevents these wiring and lines from arranging a plurality of pallet changers holding works on the table. This causes a low productivity because a plurality of works cannot be simultaneously machined.

SUMMARY OF THE INVENTION

It is an object of the present invention to provide a device for indexing which is simplified by utilizing an extra action other than the normal action of the tool attached to a cutting device of a machining center.

It is another object of the present invention to provide a device for indexing which is adapted for machining a work easily and automatically by programming an NC device so that the device may improve its productivity.

Other and further objects of this invention will be obvious upon an understanding of the illustrative embodiments, the appended claims, and various advantages not referred to herein will occur to one skilled in the art upon the employment of the invention in practice.

An apparatus according to the present invention comprises an indexing plate connected to a driving shaft of an indexing table and held by a stopper on the normal position on base, a push bar interlocking operatively with an extra action other than the normal action of a tool to move linearly relative to the base, an actuating means for rotating the indexing plate by engaging the push bar operatively, thereby disengaging a stoppage of the indexing plate by the stopper and rotating at fixed angles with the aid of the actuating means to index the work.

The foregoing apparatus based on the present invention is so constructed to reciprocatingly move the push bar, interlocking with an extra action other than the normal action of the tool to index the work attached to the cutting device of the machining center. The push bar then moves forward, and the indexing plate connected to the work is disengaged from its stoppage to rotate the indexing plate with the aid of the actuating member.

As a result, when the indexing plate rotates at fixed angles, the push bar moves backward by releasing the force pressed by the tool into the push bar. This backward movement makes a stoppage of the indexing plate engage by the stopper, stopping the indexing plate. Therefore, the indexing plate rotates by fixed angles, corresponding to one stroke of the push bar. An accurate indexing of the work can be achieved.

EFFECT OF THE INVENTION

As described above, the present invention is so constructed to automatically index a work in such a way as to reciprocatingly move the push bar of the device for indexing, interlocking with an extra action other than the normal action of a tool of a cutting device of a machining center. The device is, therefore, simply construed as a whole and can index a work by programming in the NC device, thus improving the productivity.

Since no hydraulic or air-pressure source to the indexing table is required, the space above the indexing table can be effectively available and can accommodate pallet changers holding a work on the table. Therefore, its productivity may improve and its versatility may also improve.

BRIEF DESCRIPTION OF THE DRAWINGS

FIG. 1 shows a whole front view of the construction which applies the device for indexing of the present invention to a machining center.

FIGS. 2 and 3 show a front view and a side view of the device for in with it partly broker, respectively.

FIG. 4 shows a view illustrating an operation of the device for indexing.

FIG. 5 is an enlarged front view of the essential part.

FIGS. 6 and 7 show a front view and a side view of the general whole construction of the device for indexing, respectively.

FIG. 8 shows a side view of a guide shaft.

FIG. 9 is a view illustrating an engagement between a guide shaft and a stopper member.

DETAILED DESCRIPTION OF PREFERRED EMBODIMENTS

(THE FIRST EMBODIMENT)

Referring now to FIGS. 1-5 inclusive, a first embodiment of the present invention will be described as follows.

Figure 1:
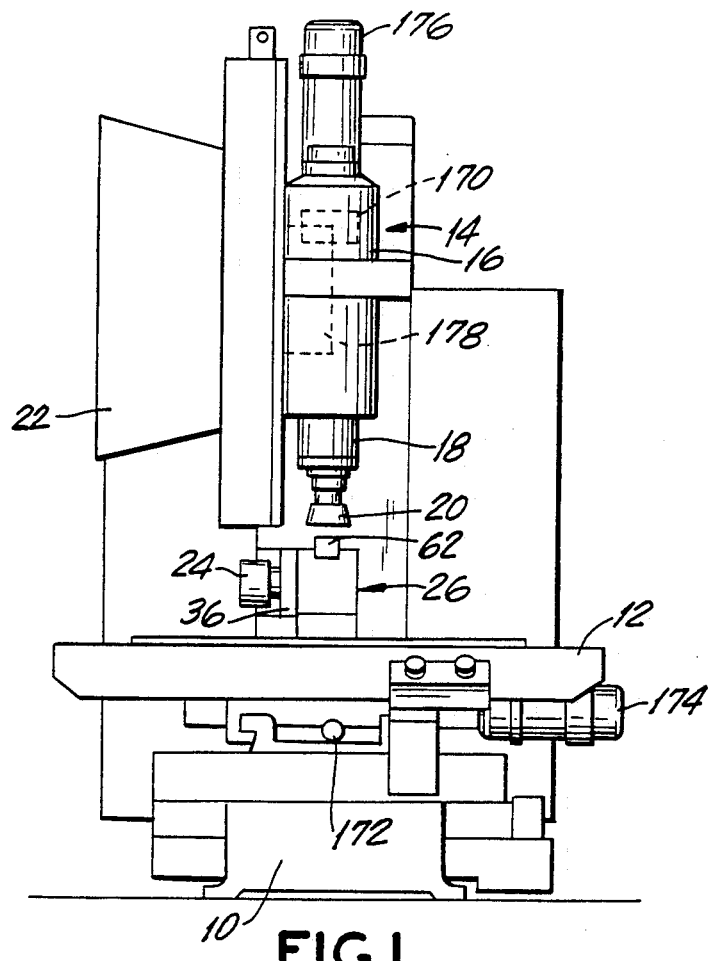
FIGS. 1-5 inclusive, illustrate a first embodiment.
Figure 2:
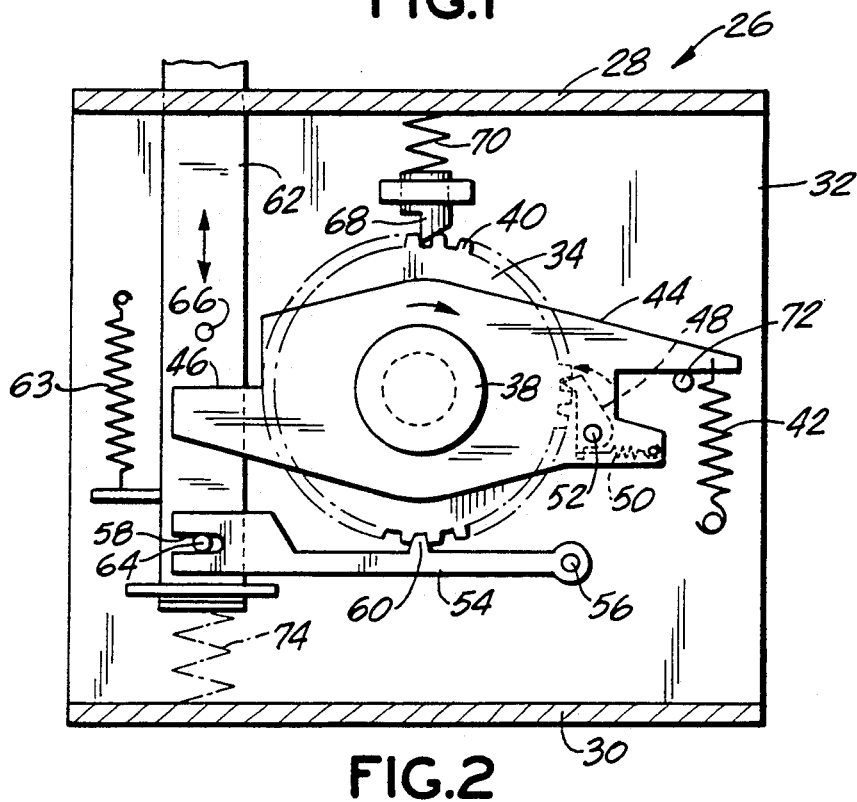
Figure 3:
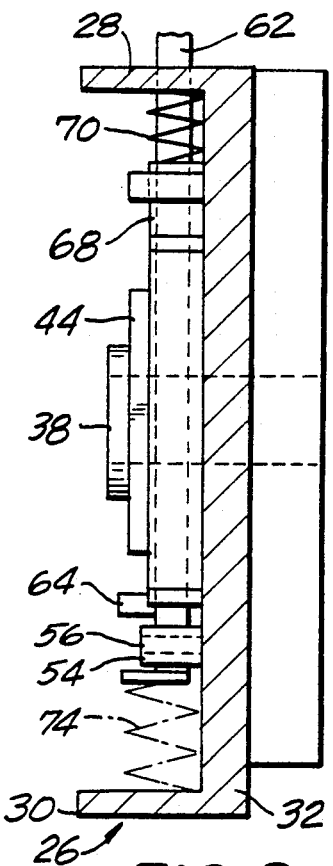

FIG. 1 shows a general construction of a machining center including an index device according to the present invention, wherein a table 12 is positioned to move horizontally on the base 10. Above the table 12, a cutting device 14 is installed. The cutting device 14 comprises a spindle head 16, with a spindle 18 attached rotatably to the spindle head 16, the spindle 18 having a face cutter 20, as a cutting tool, at its tip and driven by a drive motor 170. At the front of the cutting device 14, the tool box 22 holding various tools is installed. On the table 12, an index device 26 for actuating a work is provided, as shown in FIGS. 2 and 3, within a rectangular base 32 having a top flange 28 at its top and a bottom flange 30 at its bottom, respectively. In the base 32, an indexing plate 34 is rotatably supported about an axis 38 connected to an indexing table 36 (See FIG. 1) holding the work 24. On the circumferential surface of the indexing plate 34, the engaging claw 40 is formed.

To the indexing plate 34, a thin and elongated rotating plate 44 is rotatably provided. The rotating plate 44 is urged by a spring 42 in the clockwise direction (the direction is indicated by an arrow in FIG. 2) relative to the indexing plate 34. The rotating plate 44 forms an engaged portion 46 with one side thereof broken. On the other side of the rotating plate 44, a claw member 48, as an actuator, engaged in the engaging claw 40 is rotatably mounted to a supporting axis 52 and is urged by a spring 50 in the direction to be pressed towards the engaging claw 40. The direction shown by the arrow as indicated by a dotted line. Thus an actuating means of the indexing plate 34 comprises the rotating plate 44, the engaged portion 46 and the claw member 48.

A crank member 54 like an elongating rod, as a stopper is provided to the base 32, to fluctuate about a fluctuating axis 56, the crank member 54 having an engaged groove 58 at the tip and being provided with a crank pin 60 engaged in the engaging claw 40 at the center thereof.

A push bar 62 like an elongating rod is reciprocatably provided to the base 32, being urged by a spring 63 upwards (an upward direction in FIG. 2), so that the push bar 62 is so construed to be actuated, interlocking with an extra action other than the normal action of the face cutter 20. The push bar 62 is provided with a first pin 64 engaging in the engaged groove 58 of the crank member 54 at the tip thereof and a second pin 66 engaging operatively in the engaged portion 46 of the rotating plate 44 at the center thereof.

In addition, reference numeral 68 denotes a whirl-stop pin, which is attached to the top flange 28 and urged downwards by a spring 70, and reference numeral 72 denotes a stopper for regulating revolutions of the rotating plate 44 in the clockwise direction in FIG. 2 (the direction of the arrow). Reference numeral 74 denotes a spring for urging the push bar 62 backwards (an upward direction in FIG. 2), together with the spring 63 or instead of the spring 63.

Next, an operation of the first embodiment will be described in detail with reference to FIGS. 4 and 5.

In case of indexing the work 24 by the face cutter 20 attached to the cutting device 14 of the machining center, the push bar 62 moves reciprocatingly, interlocking with an extra action other than the normal action of the face cutter 20 in accordance with the programming of NC device.

Figure 4:
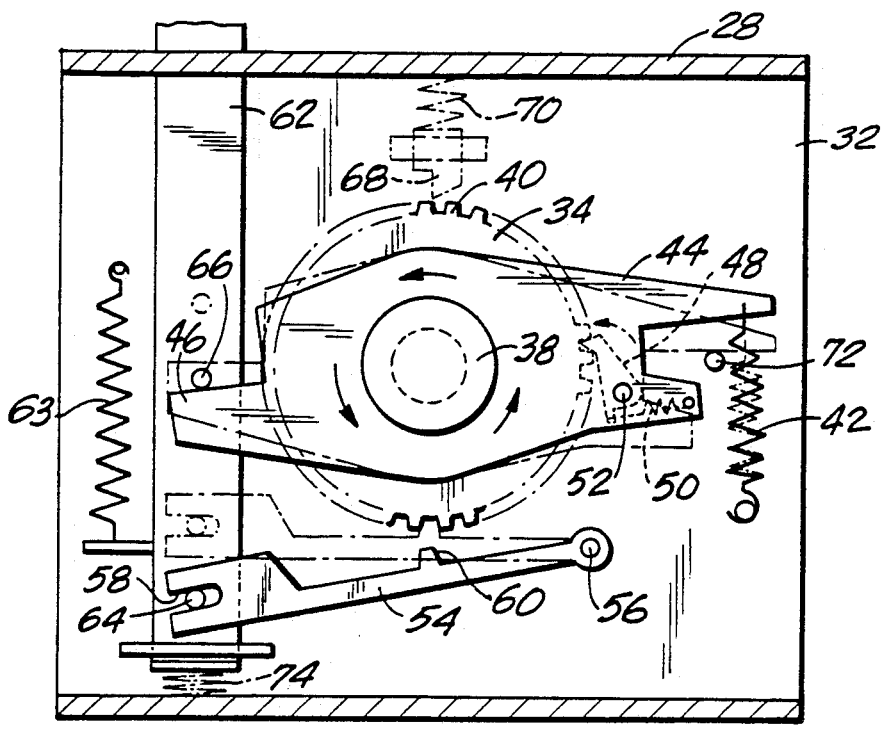
Figure 5:
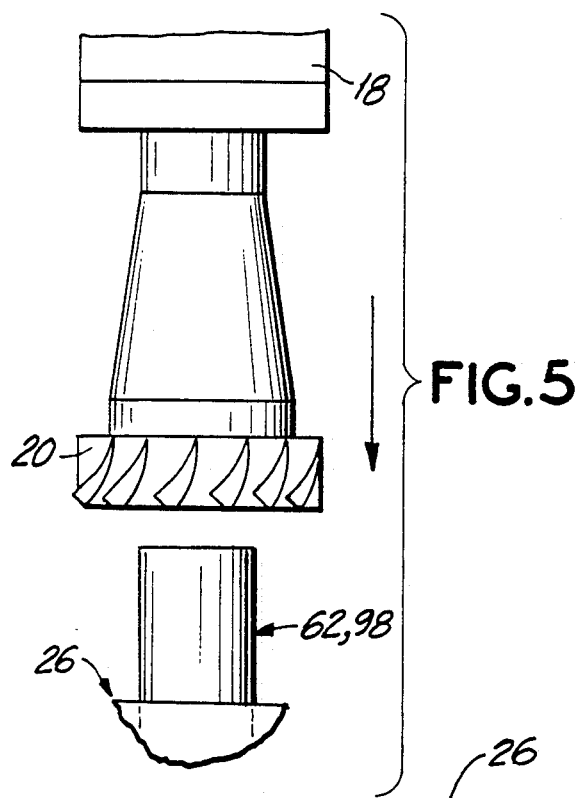

In FIG. 5, when the face cutter 20 moves in the direction of an arrow therein, the push bar 62 moves in the downward direction (a downward direction in FIG. 4). Then the crank member 54 fluctuates about the fluctuating axis 56 in the downward direction in FIG. 4 and comes to disconnect an engagement between the crank pin 60 and the engaging claw 40 or the indexing plate 34, so that the indexing plate 34 may be rotated. Thereafter, the engaged portion 46 is pressed downwards by the second pin 66 to rotate the rotating plate 44 in the direction of an arrow in FIG. 4, so that the indexing plate 34 may rotate by the upward movement of the claw member 48. As a result, the engaging claw 40 presses the whirl-stop pin 68 upwards against an urging force of the spring 70, thus disconnecting the engagement between the whirl-stop pin 68 and the engaging claw 40. Therefore, the indexing plate 34 rotates by only one pitch of the engaging claw 40.

The face cutter 20 moves in the upward direction in FIG. 5 to release the push bar 62 from the force pressed by the face cutter 20, thus moving the push bar 62 in an upward direction with the aid of an urging force of the spring 63. Then the rotating plate 44 rotates gradually in the opposite direction and reaches a position as indicated by the dotted line in FIG. 4 with the aid of the urging force of the spring 42, with the second pin 66 and the engaged portion 46 engaged each other. The crank member 54 reaches to a position as indicated by the dotted line to fluctuate in the upward direction in FIG. 4 as well, followed by an upward movement of the first pin 64, so that the crank pin 60 is recovered in its original position and engaged in the following engaging claw 40 to stop revolutions of the indexing plate 34. Thus the indexing plate 34 may be firmly stopped.

The above index device 26 is constructed to reciprocate the push bar 62 in a vertical direction in accordance with the programming in the NC device, utilizing an extra action other than the normal action of the face cutter 20 attached to the cutting device 14 and to index the work 24 such that the indexing plate 34 may rotate itself at fixed angles by disengaging between the crank pin 60 and the engaging claw 40, corresponding to one stroke of the push bar 62 within the index device 26. This results in simplifying the device without the need for providing various members for actuating the indexing table and the like, different from the conventional devices. This also results in automatic indexing by only programming in the NC device, taking the indexing of the work 24 into account. Thus it is easy to machine the work 24 and improves productivity.

Unlike the conventional index device it is not necessary to have lines from a hydraulic or air-pressed source to the indexing table 36, because our index device 26 utilizes an extra action other than the normal action of the face cutter 20 to index the work 24.

Since no electrical wiring is required, the space above the table 12 can be effectively available and a plurality of pallet changers holding the work 24 on the table 12 can be arranged. Thus the index device 26 can machine a plurality of works 24 simultaneously and the index device 26 can also be actuated in various ways. This results in improving its productivity.

Furthermore, since no manual operation is required while an operator is indexing the work 24 and the work 24 is automatically indexed in accordance with the programming in NC device 178. Hence, it can machine the work 24 continuously all day, i.e. for 24 hours, thus improving productivity further (SECOND EMBODIMENT)

Referring next to FIG. 1 and FIGS. 6-9 inclusive, second embodiment of the present invention will be described hereinafter. Some reference characters in a second embodiment designate the like or corresponding parts in the first embodiment.

Figure 6:
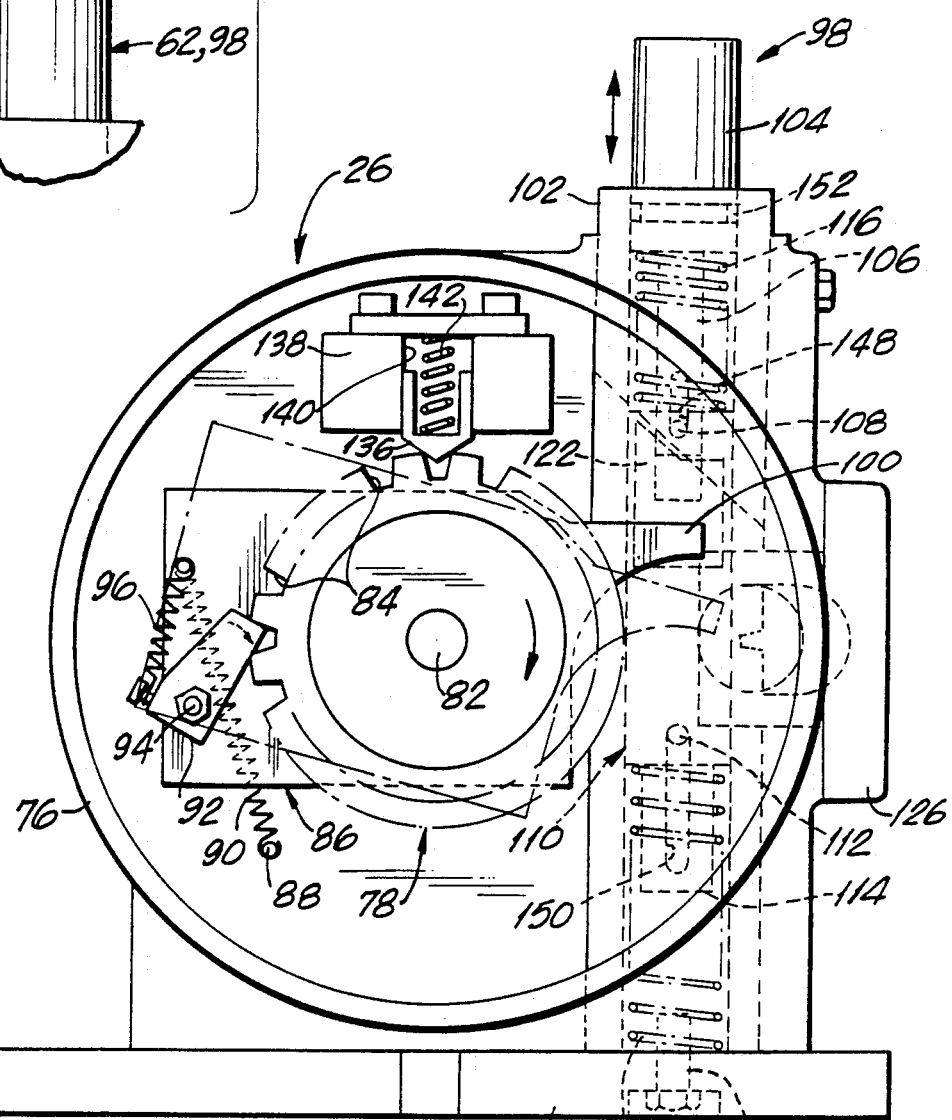
FIGS. 6-9 inclusive, illustrate a second embodiment.
Figure 7:
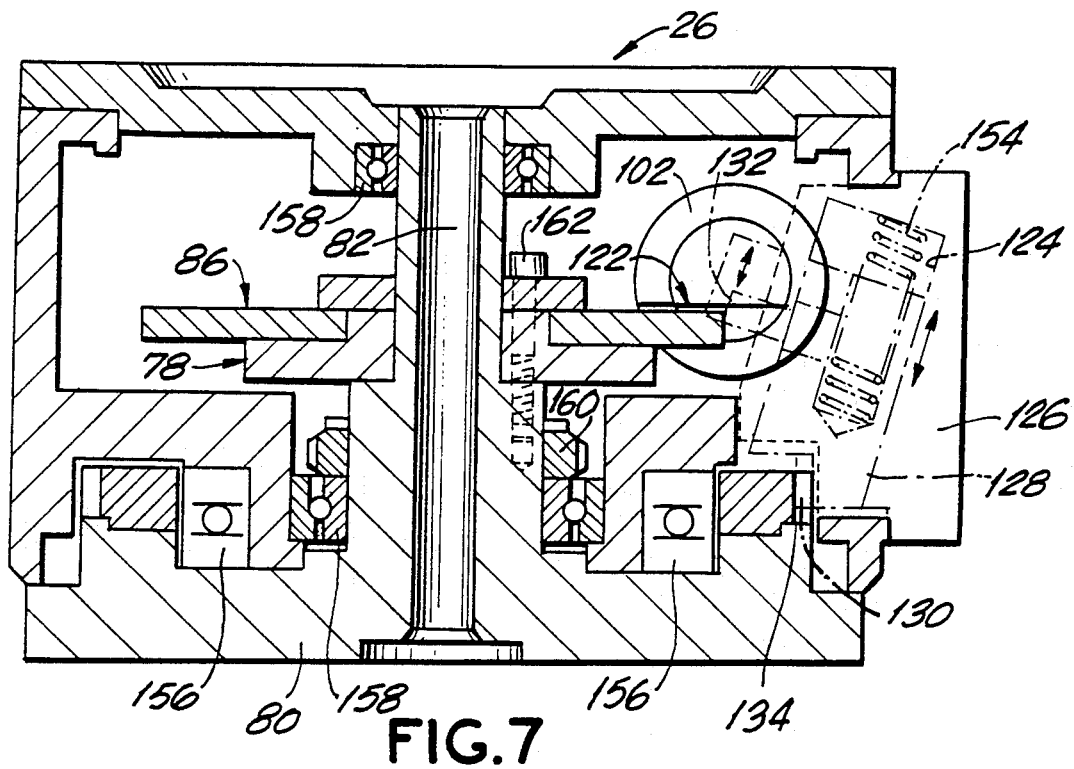

Referring now to these drawings, wherein there is shown an index device 26 for indexing a work 24 on the table, slidably displaced on the base 10 in the horizontal direction. The index device 26 is, as illustrated in FIGS. 6 and 7, supported such that an indexing plate 78 may rotate about an axis 82, as an actuating axis, attached to an indexing table 80. On the circumferential surface of the indexing plate 78, an engaging claw 84 is formed.

In the rear side of the indexing plate 78, a thin and elongating rotating plate 86 is rotatably arranged The rotating plate 86 is urged by a spring 90 in the counter-clockwise direction in FIG. 6, with one end of the spring 90 engaged in a pin 88 implanted on the housing 76. In one side (a left side in FIG. 6) of the rotating plate 86, a claw member 92 is engaged in the engaging claw 84, as an actuator, mounted rotatably to a supporting axis 94. This results in urging the engaging claw 84 in the direction to be pressed (a direction of a dotted-line arrow in FIG. 6). In the other side (a right side in FIG. 6) of the rotating plate 86, the engaged portion 100 engaged in the push bar 98 describe hereinafter extends in the direction of one side of the index device 26. Thus an actuating means of the indexing plate 78 comprises the rotating plate 86, the claw member 92 and the engaged portion 100 actuated by the push bar 98.

On the other hand, in the rear side of the housing 76, the push bar 98 is arranged to move reciprocatingly in a holding pipe 102 extending vertically. The push bar 98 comprises a pressing portion 104 arranged in the upper portion thereof, a guide shaft 110 connected operatively to the engaged portion 104 by means of a first connecting pin 108 which projects outwards on a connecting rod 106 extending downwards, and a stopper shaft 114 is connected to the guide shaft 110 by the means of a second connecting pin 112. In addition, reference numerals 116 and 118 are upper and lower springs respectively, by which the push bar 98 is urged in the backward direction, i.e., the upward direction in FIG. 6. The push bar 98 is, therefore, subjected to a large urging force by the above springs 116 and 118.

Figure 8:
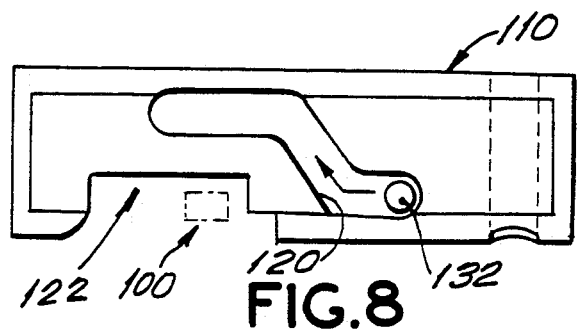
Figure 9:
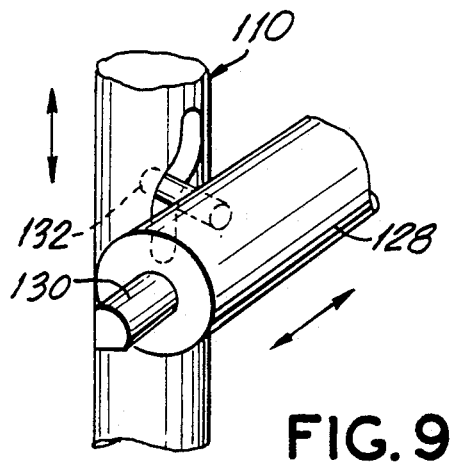

On the outer surface of the guide shaft 110, a crank-like sliding groove 120 extending vertically at the outer side (a right side in FIG. 6) and a cutout portion 122 at the front side is formed respectively, as illustrated in FIG. 8. The engaged portion 100 of the rotating plate 86 is designed for fitting into the cutout portion 122, thus pressing the engaged portion 100 downwards by downward movement of the push bar 98. Therefore, when the push bar 98 moves downwards, interlocking with an extra action other than the normal action of the face cutter 20, the rotating plate 86 rotates in a clockwise direction in FIG. 6 (a direction as indicated by an arrow in FIG. 6). In the side of the housing 76 (the right side in FIGS. 6 and 7), a side member 126 having a fitted hole 124 extending obliquely in the horizontal direction is provided as illustrated in FIG. 7. In the fitted hole 124 a cylindrical stopper member 128, as a whirl-stop member, is arranged so as to enable itself to move reciprocatingly in the direction as indicated by an arrow in FIG. 7. The stopper member 128 is provided with an engaged member 130 at its front end and an engaging pin 132 at the inner portion, respectively, such that the engaging pin 132 may move along the sliding groove 120 of the guide shaft 110, as illustrated in FIG. 9. Thus the stopper member 128 moves reciprocatingly within the fitted hole 124, corresponding to the vertical action of the push bar 98, to engage or disengage between the engaged member 130 and the whirl-stop gear 134 of the indexing table 80. Hence, a stoppage of the indexing plate 78 comes to be controlled.

In addition, in FIG. 6, reference numeral 136 denotes a whirl-stop pin, which is slidably attached to the fitted hole 140 of the holding member 138 arranged in the upper portion of the housing 76. The whirl-stop pin 136 acts as a stopper for the indexing plate 78, being urged by a spring 142 in the downward direction. Reference numeral 144 denotes a stopper bolt which projects above the lower base 146 and controls a downward movement of the push bar 98. Reference numeral 148 denotes a sliding groove of the first connecting pin 108 formed on the connecting rod 106. Reference numeral 150 denotes a sliding groove of the second connecting pin 112 formed on the holding pipe 102 and reference numeral 152 denotes an O-ring. In FIG. 7, reference numeral 154 denotes a spring to urge the stopper member 128 forwards, and reference numerals 156 and 158 denote a thrust bearing and ball bearings, respectively. Reference numeral 160 denotes a check nut, and reference numeral 162 denotes a set bolt for integrally securing the indexing plate 78 to the indexing table 80. Next, an operation of the above second embodiment will be described in detail with reference to FIGS. 5-9.

In these drawings, when the work 24 is indexed by the face cutter 20 attached to the cutting device 14 of the machining center, the push bar 98 reciprocates, interlocking with an extra action other than the normal action of the face cutter 20 in accordance with the programming in the NC device.

In FIG. 5, when the face cutter 20 moves in the direction of an arrow therein, the push bar 98 moves in the forward direction (a downward direction in FIG. 6) with the aid of the force by the face cutter 20. As the guide shaft 110 of the push bar 98 moves downwards, the engaging pin 132 moves along the sliding groove 120 of the guide shaft 110 in the direction of the arrow in FIG. 8. Then the stopper member 128 moves backwards (an upward direction in FIG. 7) to disengage the engaged member 130 of the stopper member 128 and the whirl-stop gear 134. The indexing plate 78 may, therefore, rotate itself.

Further, when the guide shaft 110 moves downwards, the upper portion of the cutout portion 122 presses the engaged portion 100 downwards to rotate the rotating plate 86 in clockwise direction in FIG. 6. Thus the indexing plate 86 is rotated by the claw member 92 to move the whirl-stop pin 136 upwards against the urging force of the spring 142 and disconnect the engagement between the whirl-stop pin 136 and the engaging claw 84. As a result, the indexing plate 78 may rotate itself at fixed angles to index the work 24 firmly. In addition, when the revolutions of the indexing plate 78 corresponds to one pitch of the engaging claw 84, the whirl-stop pin 136 will be returned to its original position to stop the revolutions of the indexing plate 78 firmly. Thus the whirl-stop pin 136 reengages in the engaging claw 84.

When the face cutter 20 moves in the upward direction in FIG. 5 to release the push bar 98 from the force by the face cutter 20, the push bar 98 moves in the upward direction in FIG. 6 with the aid of both an upper spring 116 and a lower spring 118. As a result, the rotating plate 86 rotates in the opposite direction of the arrow in FIG. 6 with the aid of the urging force of the spring 90 to disconnect the engagement between the cutout portion 122 of the guide shaft 110 and the engaged portion 100. At the same time, the engaging pin 132 moves along the sliding groove 120 in the opposite direction of the arrow in FIG. 8 to return in its original position as indicated by a solid line therein. Thus the stopper member 128 moves in the forward direction (a downward direction in FIG. 7) with the aid of the spring 154 to engage between the engaged portion 130 of the stopper member 128 and the whirl-stop gear 34. The indexing plate 78 then stop its rotation to hold the indexing plate 78 in position within the housing 76 firmly.

Therefore, the second embodiment may obtain the same operations and effects as the first embodiment may obtain.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

I claim:

1. An NC machine tool comprising:
 a spindle having a tool at its one end;
 a drive motor for driving said spindle for rotation;
 an index device including a housing and a index table on which a work is held, said table being supported for rotation on said housing, said housing accomodating means for actuating said table when indexing said work;
 a push bar movable in its longitudinal direction in said housing of said index device, said push bar extending into said housing and outwardly of said housing so that said push bar can be pushed and moved longitudinally by utilizing an extra relative movement between said spindle and said index device other than a working relative movement between them for machining said work in accordance with the programming in NC device; and
 said means for actuating said table comprising means for operatively connecting said push bar to said table so that said table is rotated for a predetermined angle in response to the longitudinal movement of said push bar to index said work.

2. An NC milling machine as defined in claim 1 in which said index device is mounted on a table, said feed means comprising means for feeding said table in two horizontal directions perpendicular to each other, and means for feeding said spindle in a vertical direction, said push bar being engaged with said tool of said spindle and pushed and moved downwardly by said tool when said spindle is moved downwardly.

3. An NC milling machine as defined in claim 2 further comprising spring means for resiliently urging said push bar to move upwardly into the original position thereof when said spindle is moved upwardly so that said push bar is moved reciprocatingly whenever said spindle is moved downwardly and upwardly, said index table is rotated at an angle for one reciprocating movement of said push bar.

4. An NC machine tool as defined in claim 3 in which said said means for actuating said index table comprises a indexing plate coaxially fixed to the shaft of said index table and an arm pivotally supported about said shaft, said push bar including a pin adapted to be engaged with said arm to rotate it at an angle when said push bar is moved downwardly, said indexing plate having a plurality of teeth formed along the circumference thereof at regular spaces, said arm having a click adapted to be engaged with one of said teeth so that said indexing plate is rotated at an angle by said click of said arm.

5. An NC machine tool as defined in claim 4 further comprising spring means for resiliently urging said arm to rotatably reverse it to the original position thereof when said push bar is move upwardly, a retaining pawl for preventing reverse rotation of said indexing plate.

6. An NC machine tool as defined in claim 5 further comprising spring means for resiliently urging said retaining pawl toward said teeth of said indexing plate.

* * * * *